(12) United States Patent
Koseki et al.

(10) Patent No.: US 10,218,302 B2
(45) Date of Patent: Feb. 26, 2019

(54) CONTROLLER AND CONTROL METHOD FOR ELECTRIC MOTOR

(71) Applicant: HITACHI AUTOMOTIVE SYSTEMS, LTD., Hitachinaka-shi, Ibaraki (JP)

(72) Inventors: Tomonobu Koseki, Isesaki (JP); Tomishige Yatsugi, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 173 days.

(21) Appl. No.: 15/127,310

(22) PCT Filed: Mar. 16, 2015

(86) PCT No.: PCT/JP2015/057713
§ 371 (c)(1),
(2) Date: Sep. 19, 2016

(87) PCT Pub. No.: WO2015/156090
PCT Pub. Date: Oct. 15, 2015

(65) Prior Publication Data
US 2018/0175779 A1    Jun. 21, 2018

(30) Foreign Application Priority Data

Apr. 10, 2014    (JP) .................................. 2014-081043

(51) Int. Cl.
*H02P 1/00*    (2006.01)
*H02P 27/06*    (2006.01)
(Continued)

(52) U.S. Cl.
CPC .......... *H02P 29/028* (2013.01); *B62D 5/0484* (2013.01); *B62D 5/0487* (2013.01);
(Continued)

(58) Field of Classification Search
None
See application file for complete search history.

(56) References Cited

U.S. PATENT DOCUMENTS 6,208,923 B1    3/2001   Hommel
8,878,474 B2    11/2014  Kezobo et al.
(Continued)

FOREIGN PATENT DOCUMENTS

DE              19834870 A1    2/2000
DE       10 2012 221 536       8/2013
(Continued)

OTHER PUBLICATIONS

German Office Action dated Aug. 27, 2018 in Application No. 1120150017186 and its Partial English translation.

*Primary Examiner* — Thomas G Black
*Assistant Examiner* — Demetra R Smith-Stewart
(74) *Attorney, Agent, or Firm* — Foley & Lardner LLP

(57) ABSTRACT

To provide a controller and a control method for an electric motor including plural energization systems each composed of an inverter and coils corresponding to plural phases. The controller performs first diagnosis processing for detecting an abnormality in each system under energization control, and second diagnosis processing for detecting an abnormality in each system not under energization control. When the first diagnosis processing detects an abnormality in one system and the second diagnosis processing detects no abnormality in the one system or when the first diagnosis processing detects an abnormality in one system to thereby stop energization control over the one system and in such a state, an abnormality is detected in another system, the energization control over the one system is restarted to drive (Continued)

the electric motor. It is therefore possible to avoid stopping output from a normal system when some of the systems have an abnormality.

18 Claims, 6 Drawing Sheets

(51) Int. Cl.
  *H02P 29/028* (2016.01)
  *H02P 29/032* (2016.01)
  *H02P 25/22* (2006.01)
  *H02H 7/08* (2006.01)
  *B62D 5/04* (2006.01)

(52) U.S. Cl.
  CPC ............... *H02H 7/08* (2013.01); *H02P 25/22* (2013.01); *H02P 27/06* (2013.01); *H02P 29/032* (2016.02)

(56) References Cited

U.S. PATENT DOCUMENTS

| | | | |
|---|---|---|---|
| 2011/0156626 A1* | 6/2011 | Mukai | B62D 5/0487 318/400.21 |
| 2011/0270545 A1 | 11/2011 | Doktar et al. | |
| 2013/0299271 A1 | 11/2013 | Endo et al. | |
| 2016/0124400 A1* | 5/2016 | Kanayama | G05B 13/02 307/116 |
| 2016/0204730 A1* | 7/2016 | Suzuki | H02P 29/032 318/139 |
| 2016/0325777 A1* | 11/2016 | Mori | H02P 25/22 |
| 2017/0033725 A1* | 2/2017 | Koseki | B62D 5/0484 |
| 2017/0070178 A1* | 3/2017 | Koseki | H02P 27/06 |
| 2017/0085205 A1* | 3/2017 | Koseki | B62D 5/0484 |

FOREIGN PATENT DOCUMENTS

| | | |
|---|---|---|
| JP | 2614788 B2 | 5/1997 |
| JP | 2009-201194 A | 9/2009 |
| JP | 2010-011688 A | 1/2010 |
| JP | 2013-236486 A | 11/2013 |

* cited by examiner

CONTROLLER AND CONTROL METHOD FOR ELECTRIC MOTOR

TECHNICAL FIELD

The present invention relates to a controller for an electric motor equipped with plural energization systems each including an inverter and coils corresponding to plural phases, and to a control method therefor.

BACKGROUND ART

Patent Document 1 discloses a controller for an AC electric motor that applies voltage from a DC power supply to a multi-phase AC electric motor by means of a plurality of power converters. The controller comprises: detecting means for detecting an output current from the power converters; first coordinate transforming means for transforming a current detection value from one of the power converters into coordinates on a rotating coordinate system; second coordinate transforming means for transforming a current detection value from the other power converter into coordinates on the rotating coordinate system; average value calculating means for calculating an average output current value based on output signals from the first and second coordinate transforming means; voltage command generating means for generating a representative two-phase voltage command value based on an output from the average value calculating means, an excitation current command value, and a torque current command value; correction signal generating means for generating a correction signal based on outputs from the first and second coordinate transforming means; voltage command correcting means for generating a plurality of two-phase voltage command values based on an output from the correction signal generating means and an output from the voltage command generating means; and a plurality of command coordinate transforming means for generating a three-phase voltage command based on an output from the voltage command correcting means, wherein an unbalanced current of the multi-phase AC electric motor is reduced.

REFERENCE DOCUMENT LIST

Patent Document

Patent Document 1: Japanese Patent No. 2614788

SUMMARY OF THE INVENTION

Problems to be Solved by the Invention

In the electric motor equipped with plural energization systems each composed of an inverter and coils corresponding to plural phases, for example, when a short-circuit occurs in one energization system, a loop current flows by way of the short-circuited portion and influences an energization current of another normal energization system, hereby resulting in an abnormality that an overcurrent flows in the other normal energization system, an abnormality of energization control, and the like. Because of such abnormality, the inverter of the normal energization system might be stopped.

The present invention has been accomplished in view of some of the above problems and accordingly it is an object of the present invention to provide a controller and a control method for an electric motor, which can avoid stopping the output from a normal energization system in case an abnormality occurs in some of the plural energization systems.

Means for Solving the Problems

In order to achieve the object, the present invention provides a controller for an electric motor equipped with a plurality of energization systems each composed of an inverter and coils corresponding to a plurality of phases, the controller comprising a control unit that receives a detection value of a current in each of the energization systems and outputs a control signal to the inverter of each of the energization systems, wherein the control unit executes: first diagnosis processing for detecting an occurrence of an abnormality in each of the energization systems being under energization control; and second diagnosis processing for detecting an occurrence of an abnormality in each of the energization systems not being under energization control, and wherein when the first diagnosis processing detects an abnormality in one of the energization systems and the second diagnosis processing detects no abnormality in the one energization system or when the first diagnosis processing detects an abnormality in one of the energization systems to thereby stop energization control over the one energization system and in such a state, an abnormality is detected in another energization system, the energization control over the one energization system is restarted to drive the electric motor.

Furthermore, the present invention provides a control method for an electric motor equipped with two energization systems each composed of an inverter and coils corresponding to a plurality of phases, the method comprising the steps of: stopping energization control over one of the energization systems when first diagnosis processing detects an abnormality in the one energization system; executing second diagnosis processing on the one energization system when the total sum of currents flowing in the respective phases of the other energization system is normal under the condition that the energization control over the one energization system is stopped; executing second diagnosis processing on the other energization system when the second diagnosis processing detects no abnormality in the one energization system; and restarting the energization control over the one energization system when the second diagnosis processing detects an abnormality in the other energization system.

Effects of the Invention

According to the present invention, even if an abnormality occurs in an energization current of a normal energization system, for example, under the influence of a short-circuited energization system, it is possible to avoid erroneously stopping the output from the normal system.

MODE FOR CARRYING OUT THE INVENTION

Figure 1:
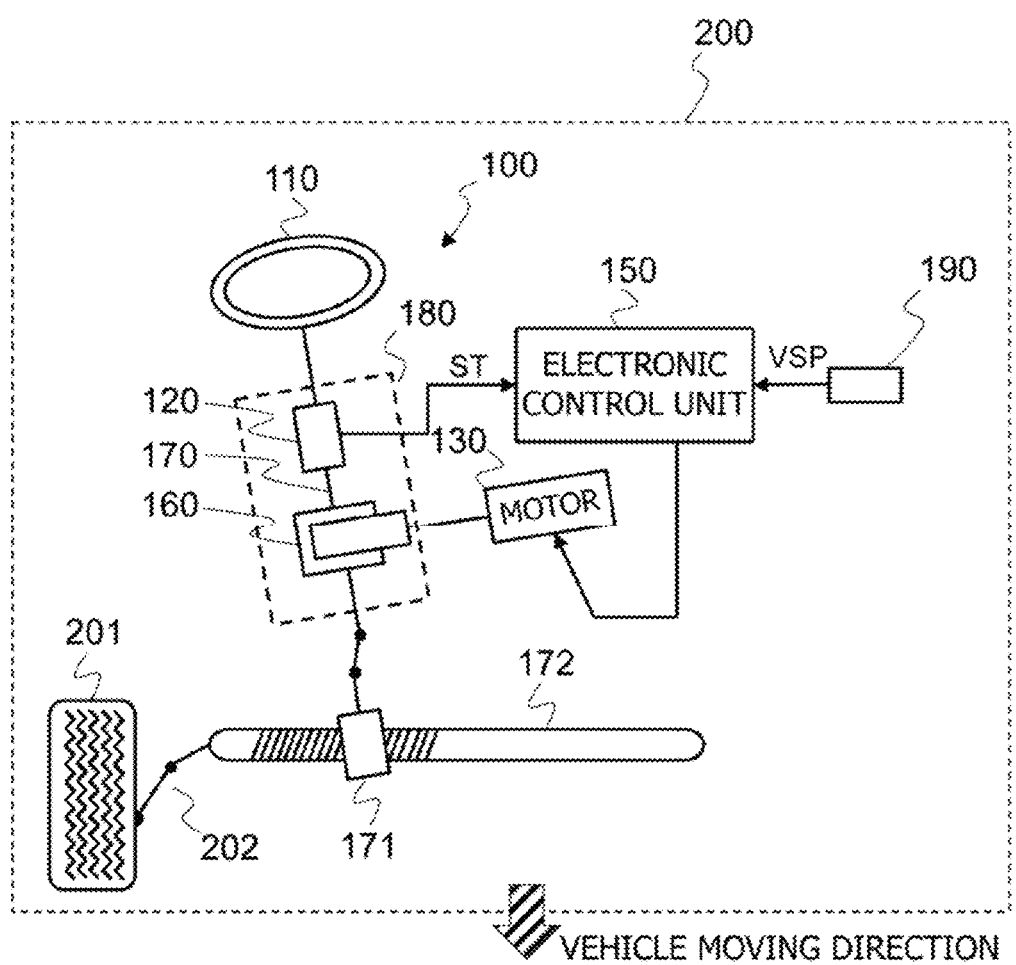
FIG. 1 is a schematic diagram of an electric power steering device that adopts a controller and a control method for an electric motor according to an embodiment of the present invention.

Hereinafter, an embodiment of the present invention will be described. FIG. 1 illustrates a configuration example of a vehicle electric power steering device that adopts a controller and a control method for an electric motor according to the present invention. An electric power steering device 100 of FIG. 1, which is installed in a vehicle 200, generates a steering assist force (assist torque) with an electric motor 130.

Electric power steering device 100 is composed of a steering wheel 110, a steering torque sensor 120, electric motor 130, an electronic control unit 150, a reducer 160 that reduces a rotational speed of electric motor 130 and then transmits the reduced rotational speed to a steering shaft (pinion shaft) 170, and the like. Steering torque sensor 120 and reducer 160 are disposed in a steering column 180 that accommodates steering shaft 170.

A pinion gear 171 is provided at the tip end of steering shaft 170. Along with the rotation of pinion gear 171, a rack gear 172 is horizontally moved to the left or right as viewed in the travel direction of vehicle 200. A steering mechanism 202 for a wheel 201 is provided at the opposite ends of rack gear 172. Along with the horizontal movement of rack gear 172, wheel 201 can change its direction.

Steering torque sensor 120 detects a steering torque of steering shaft 170, which is generated as a driver steers the vehicle, and then outputs a signal ST indicating the detected steering torque to electronic control unit 150. Electronic control unit 150 includes a microcomputer, an inverter for driving electric motor 130, an inverter drive circuit, etc. and receives, as information for determining a steering assist force, signals indicative of the steering condition and the vehicle running condition such as a vehicle speed signal VSP output from a vehicle speed sensor 190 as well as steering torque signal ST.

When receiving steering torque signal ST, vehicle speed signal VSP, or the like, electronic control unit 150 executes pulse width modulation (PWM) control on energization to electric motor 130 based on the driving condition of a vehicle indicated by these signals, thereby controlling the torque generated in electric motor 130, i.e., steering assist force. In this way, electronic control unit 150 constitutes a drive controller for electric motor 130. Regarding the inverter and the inverter drive circuit disposed in electronic control unit 150, the inverter or both of the inverter and the inverter drive circuit can be provided independently outside electronic control unit 150. In this case, electronic control unit 150 constitutes, together with the external inverter or both the external inverter and inverter drive circuit, the drive controller for electric motor 130.

Figure 2:
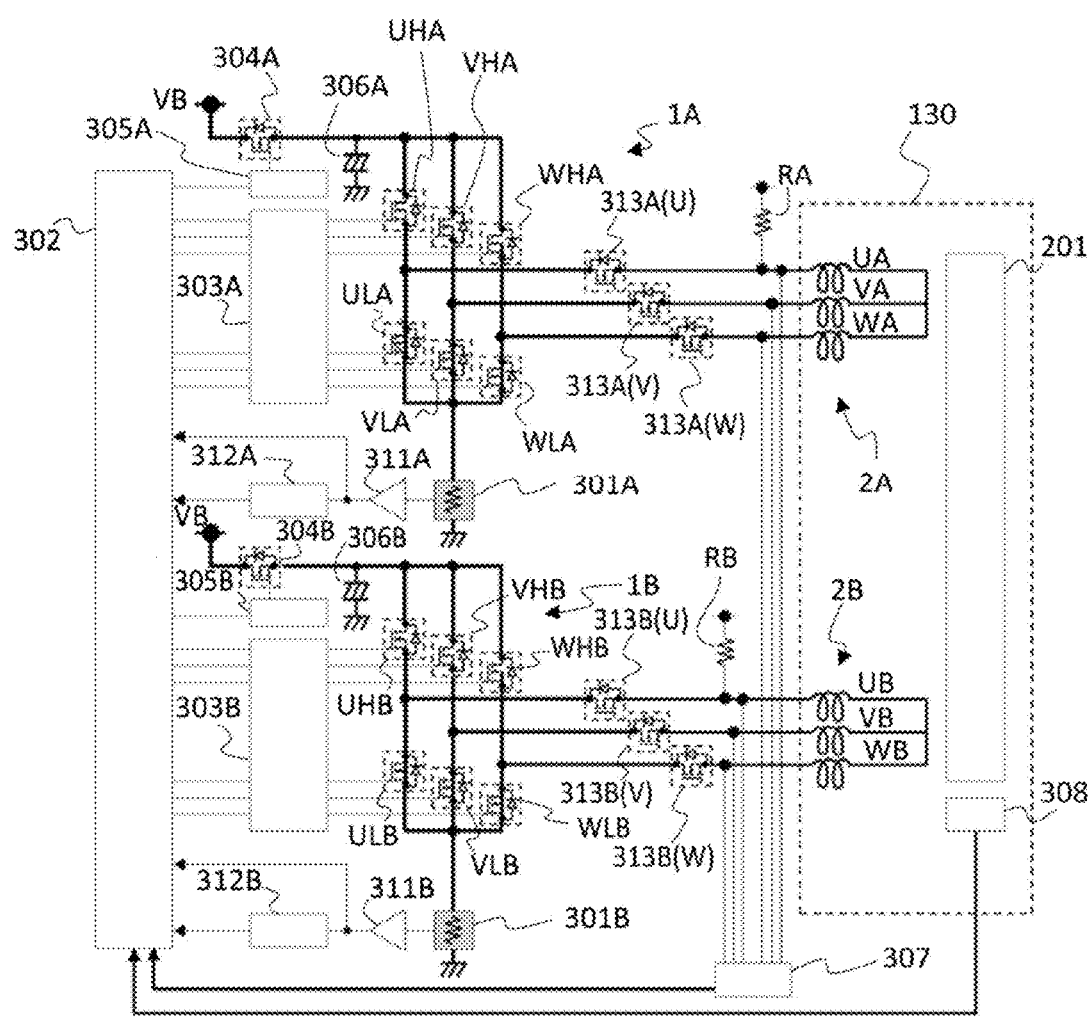
FIG. 2 is a circuit diagram of the controller according to the embodiment of the present invention.

FIG. 2 illustrates an example of the circuit configuration of electronic control unit 150 and electric motor 130. Electric motor 130 of FIG. 2 is a three-phase synchronous electric motor composed of a first coil set 2A of star-connected three-phase coils UA, VA, and WA and a second coil set 2B of star-connected three-phase coils UB, VB, and WB. In first coil set 2A and second coil set 2B, a connection point among three-phase coils U, V, and W is a neutral point.

First coil set 2A and second coil set 2B are disposed in an unillustrated cylindrical stator and a permanent magnet rotator 201 is rotatably provided inside a space formed in the center of the stator. First coil set 2A and second coil set 2B share a magnetic circuit. Moreover, first coil set 2A is directly connected to a first inverter 1A, and second coil set 2B is directly connected to a second inverter 1B. First inverter 1A supplies power to first coil set 2A, and second inverter 1B supplies power to second coil set 2B.

First inverter 1A is configured by a three-phase bridge circuit including three pairs of semiconductor switches UHA, ULA, VHA, VLA, WHA, and WLA for driving each of a U-phase coil UA, a V-phase coil VA, and a W-phase coil WA of first coil set 2A. Moreover, second inverter 1B is configured by a three-phase bridge circuit including three pairs of semiconductor switches UHB, ULB, VHB, VLB, WHB, and WLB for driving a U-phase coil UB, a V-phase coil VB, and a W-phase coil WB of second coil set 2B.

In this embodiment, the semiconductor switches constituting first inverter 1A and second inverter 1B are N-channel MOSFETs (metal oxide semiconductor field effect transistors). In first inverter 1A and second inverter 1B, semiconductor switches UH and UL have series-connected drain and source between a power supply VB and the ground point, and a connection point between semiconductor switches UH and UL is connected to U-phase coil U.

Furthermore, in first inverter 1A and second inverter 1B, semiconductor switches VH and VL have series-connected drain and source between power supply VB and the ground point, and a connection point between semiconductor switches VH and VL is connected to V-phase coil V. Moreover, in first inverter 1A and second inverter 1B, semiconductor switches WH and WL have series-connected drain and source between power supply VB and the ground point, and a connection point between semiconductor switches WH and WL is connected to W-phase coil W. Note that connection points between semiconductor switches UH and UL, between semiconductor switches VH and VL, and between semiconductor switches WH and WL serve as output points of the inverters.

A first drive circuit 303A functions to drive the semiconductor switches constituting first inverter 1A, and includes three high-potential side drivers for respectively driving semiconductor switches VHA, UHA, and WHA as high-potential side switching elements in first inverter 1A, and three low-potential side drivers for respectively driving semiconductor switches VLA, ULA, and WLA as low-potential side switching elements in first inverter 1A.

Note that the high-potential side switching element can be referred to as "upstream drive element" or "upper arm". The low-potential side switching element can be referred to as "downstream drive element" or "lower arm".

Furthermore, a second drive circuit 303B functions to drive the semiconductor switches constituting second inverter 1B, and includes three high-potential side drivers for respectively driving semiconductor switches VHB, UHB, and WHB as high-potential side switching elements in second inverter 1B, and three low-potential side drivers for respectively driving semiconductor switches VLB, ULB, and WLB as low-potential side switching elements in second inverter 1B.

First drive circuit 303A and second drive circuit 303B drive the semiconductor switches constituting inverters 1A and 1B, respectively according to a command signal from a microcomputer 302. As described above, the controller for an electric motor of this embodiment incorporates two energization systems: a first energization system including first coil set 2A and first inverter 1A and a second energization system including second coil set 2B and second inverter 1B. Note that the first energization system can be referred to as a "first channel ch1" and the second energization system can be referred to as a "second channel ch2".

A power supply relay 304A is provided between power supply VB and first inverter 1A in order to interrupt the power supply to first inverter 1A, and a power supply relay 304B is provided between power supply VB and second inverter 1B in order to interrupt the power supply to second inverter 1B. In this embodiment, power supply relays 304A and 304B are configured by semiconductor switches such as N-channel MOSFETs. The semiconductor switches constituting power supply relays 304A and 304B are driven by drive circuits 305A and 305B. As power supply relays 304A and 304B, electromagnetic relays, each of which provides electrical switching by physically moving its contact point, may be alternatively used.

Drive circuits 305A and 305B of power supply relays 304A and 304B drive the semiconductor switches constituting power supply relays 304A and 304B according to a command signal from microcomputer 302. To be specific, microcomputer 302 can independently interrupt power supply to first inverter 1A and that to second inverter 1B. Furthermore, in order to reduce fluctuations in power supply voltage to inverters 1A and 1B, capacitors 306A and 306B are provided. Specifically, capacitor 306A connects, to the ground point, the power supply line between power supply relay 304A and inverter 1A, whereas capacitor 306B connects, to the ground point, the power supply line between power supply relay 304B and inverter 1B.

Also, there is provided a voltage monitor circuit 307 for detecting respective coil-end voltages at coil sets 2A and 2B. Voltage monitor circuit 307 outputs, to microcomputer 302, signals of detected coil-end voltages at coil sets 2A and 2B. In addition, to keep the coil-end potential in coil set 2A fixed even when all the switching elements in inverter 1A are turned OFF, a pull-up resistor RA for pulling up U-phase coil UA in coil set 2A is provided. To keep the coil-end potentials in coil set 2B fixed even when all the switching elements in inverter 1B are turned OFF, a pull-up resistor RB for pulling up U-phase coil UB in coil set 2B is provided. An angle sensor 308 detects the angle of rotor 201, and outputs a signal of the detected angle to microcomputer 302.

Moreover, there are provided current sensors 301A and 301B for detecting drive current of electric motor 130, which are connected between the ground point and sources of low-potential side semiconductor switches UL, VL, and WL in first inverter 1A and second inverter 1B, respectively. Amplifier circuits 311A and 311B receive outputs from current sensors 301A and 301B. Microcomputer 302 and peak-hold circuits 312A and 312B receive outputs from amplifier circuits 311A and 311B. Microcomputer 302 receives outputs from peak-hold circuits 312A and 312B. That is, microcomputer 302 receives detection values of motor drive currents at each energization system as well as a peak value of the detected motor drive currents at each energization system.

In addition, phase relays 313A(U), 313A(V), and 313A (W) are disposed on phase lines (drive lines or energization lines) connecting between an output point of first inverter 1A and three-phase coils UA, VA, and WA so as to interrupt energization to coils UA, VA, and WA, respectively. Likewise, phase relays 313B(U), 313B(V), and 313B(W) are disposed on phase lines (drive lines or energization lines) connecting between an output point of second inverter 1B and three-phase coils UB, VB, and WB so as to interrupt energization to coils UB, VB, and WB, respectively. Here, the line connecting between the output point of the inverter and each coil can be referred to as "drive line" or "energization line" as well as "phase line".

Phase relays 313A(U), 313A(V), and 313A(W) and phase relays 313B(U), 313B(V), and 313B(W) are configured by semiconductor switches such as N channel MOSFETs and turned ON/OFF under the control of microcomputer 302.

Here, electromagnetic relays, each of which provides electrical switching by physically moving its contact point, may be alternatively used as phase relays 313.

Figure 3:
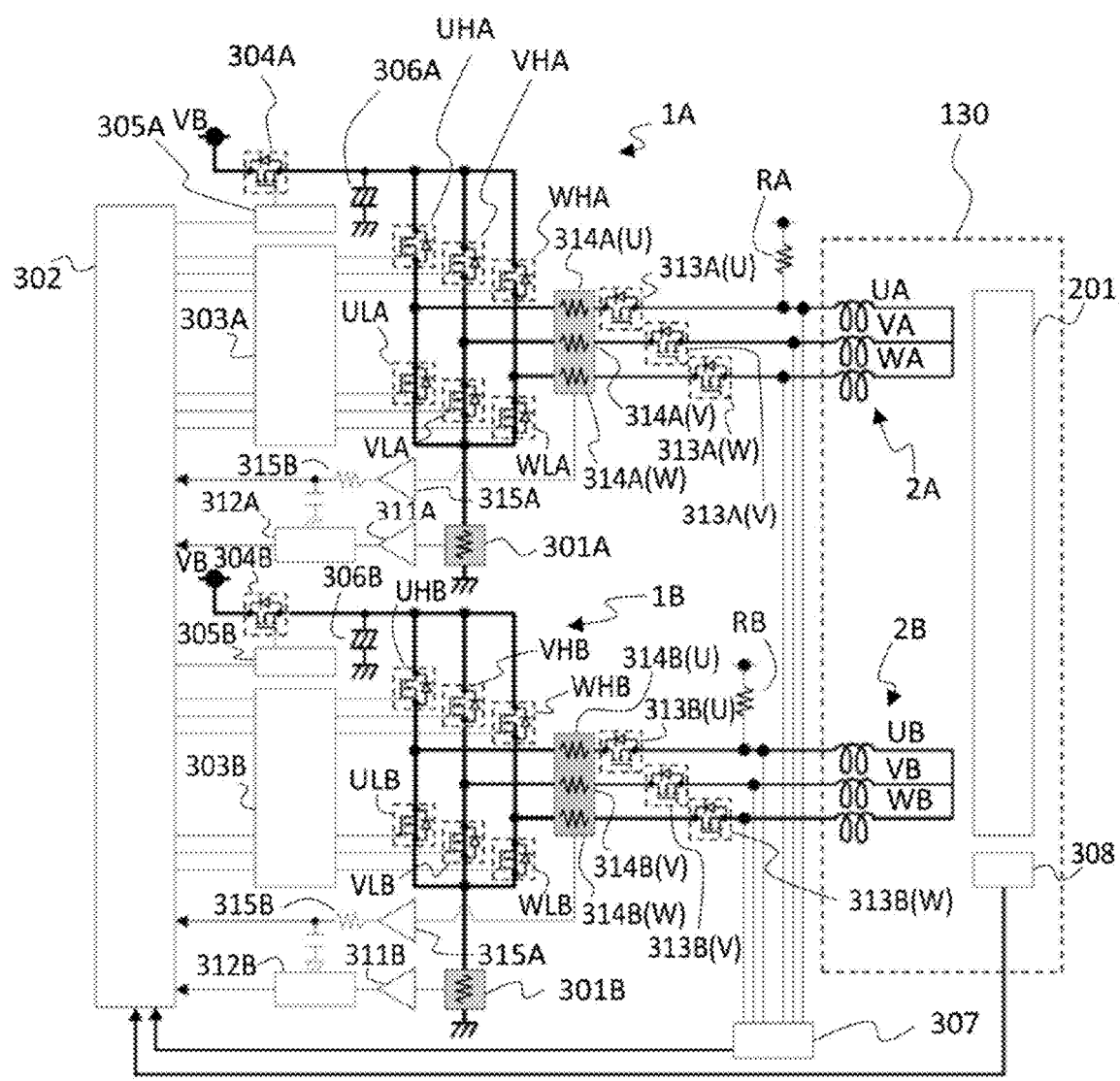
FIG. 3 is a circuit diagram of the controller according to the embodiment of the present invention.

Besides the configuration of FIG. 2, as illustrated in FIG. 3, there can be provided phase current sensors 314A(U), 314A(V), 314A(W), 314B(U), 314B(V), and 314B(W) for detecting phase currents flowing through three-phase coils U, V, and W. In FIG. 3, phase current sensors 314A(U), 314A(V), and 314A(W) are provided on phase lines connecting between an output point of first inverter 1A and three-phase coils UA, VA, and WA. Phase current sensors 314B(U), 314B(V), and 314B(W) are provided on phase lines connecting between an output point of second inverter 1B and three-phase coils UB, VB, and WB.

Microcomputer 302 receives outputs from phase current sensors 314A(U), 314A(V), 314A(W), 314B(U), 314B(V), and 314B(W) of FIG. 3. On each line connecting between phase current sensors 314 and microcomputer 302, provided are amplifier circuit 315A, and a low pass filter circuit 315B including a resistor R connected in series with a capacitor C parallel to the output of each phase current sensor 314.

Figure 4:
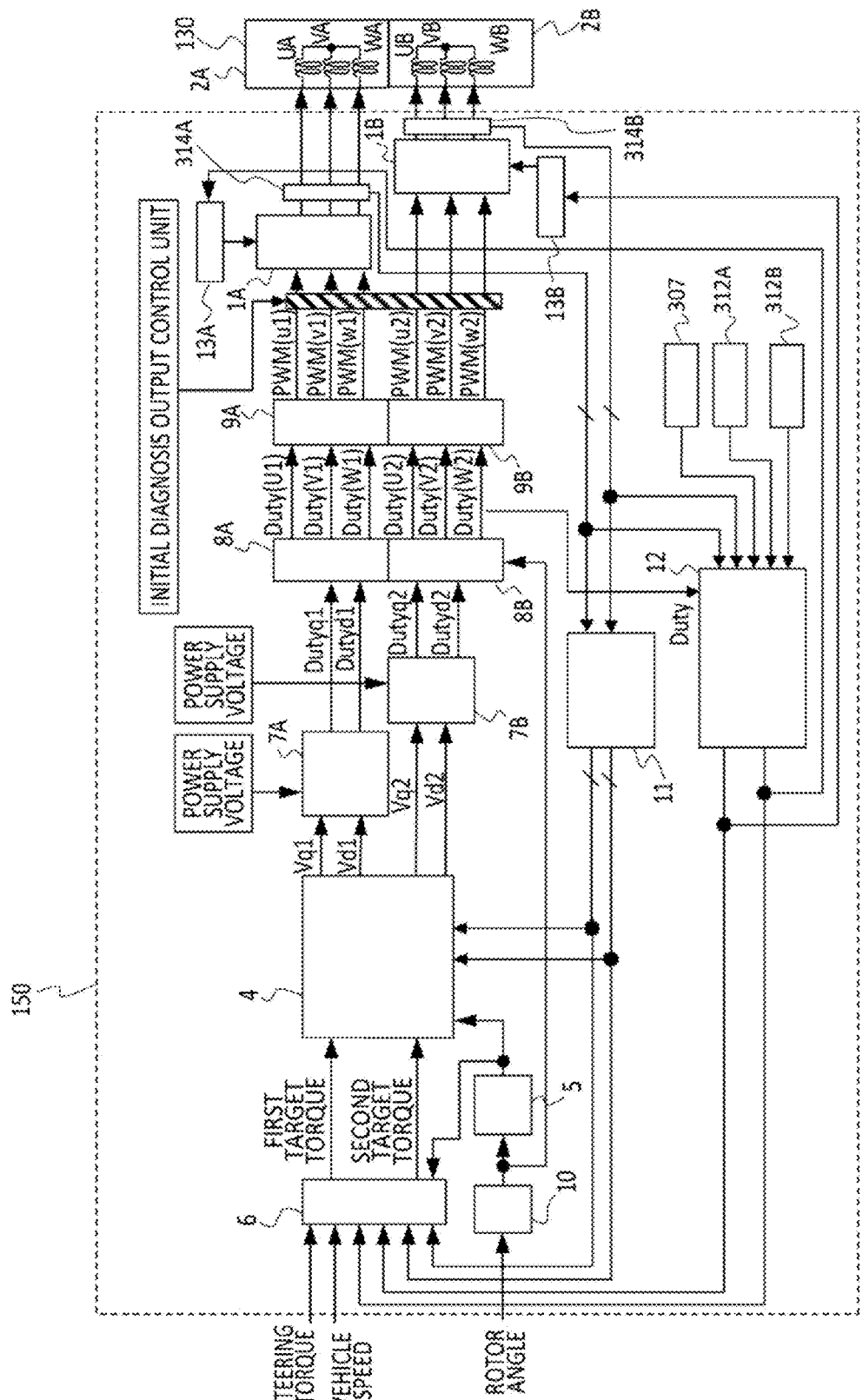
FIG. 4 is a functional block diagram of the controller according to the embodiment of the present invention.

FIG. 4 is a block diagram illustrating an example of the inverter control function of microcomputer 302. A target assist torque calculating unit 6 calculates a target assist torque, i.e., a target value of an output torque of electric motor 130 based on steering conditions such as a steering torque, the vehicle speed, and the rotational speed of electric motor 130. In this example, target assist torque calculating unit 6 individually sets a target assist torque for the first energization system and that for the second energization system, aiming at generating a target steering force corresponding to the total sum of a motor torque generated through energization control over the first energization system and that generated through energization control over the second energization system.

An angle calculating unit 10 receives a signal from angle sensor 308 and then calculates the angle of rotor 201 of electric motor 130. A motor rotational speed calculating unit 5 calculates the rotational speed (rpm) of electric motor 130 based on information about the calculated angle of rotor 201 from angle calculating unit 10 and then outputs a signal indicating the calculated motor rotational speed to an output voltage calculating unit 4 and target assist torque calculating unit 6.

Output voltage calculating unit 4 receives data about a target assist torque in each energization system, data about the rotational speed of electric motor 130, and a d-axis actual current value $I_d$ and a q-axis actual current value $I_q$ at each energization system, both of which are calculated by a three-to-two phase converting unit 11. Output voltage calculating unit 4 calculates a d-axis voltage command value $V_d1$ and a q-axis voltage command value $V_q1$ of first inverter 1A and a d-axis voltage command value $V_d2$ and a q-axis voltage command value $V_q2$ of a second inverter 1B, and then outputs the calculated values.

Three-to-two phase converting unit 11 calculates a d-axis actual current value $I_d1$ and a q-axis actual current value $I_q1$ of the first energization system based on output signals from current sensors 314A(U), 314A(V), and 314A(W), i.e., detection values of actual currents flowing through the respective phases in first coil set 2A.

In addition, three-to-two phase converting unit 11 calculates a d-axis actual current value $I_d2$ and a q-axis actual current value $I_q2$ of the second energization system based on output signals from current sensors 314B(U), 314B(V), and 314B(W), i.e., detection values of actual currents flowing through the respective phases in second coil set 2B. Three-to-two phase converting unit 11 outputs data about d-axis actual current value $I_d1$ and q-axis actual current value $I_q1$ of the first energization system and data about d-axis actual current value $I_d2$ and q-axis actual current value $I_q2$ of the second energization system to output voltage calculating unit 4 and target assist torque calculating unit 6, respectively.

Then, d-axis voltage command value $V_d1$ and q-axis voltage command value $V_q1$ output from output voltage calculating unit 4 are input to a first output duty calculating unit 7A.

First output duty calculating unit 7A calculates a d-axis duty Dutyd1 and a q-axis duty Dutyq1 of PWM control on first inverter 1A, based on d-axis voltage command value $V_d1$, q-axis voltage command value $V_q1$, and the power supply voltage of first inverter 1A.

Furthermore, d-axis voltage command value $V_d2$ and q-axis voltage command value $V_q2$ output form output voltage calculating unit 4 are input to a second output duty calculating unit 7B.

Second output duty calculating unit 7B calculates a d-axis duty Dutyd2 and a q-axis duty Dutyq2 of PWM control on second inverter 1B based on d-axis voltage command value $V_d2$, q-axis voltage command value $V_q2$, and the power supply voltage of second inverter 1B.

First two-to-three phase converting unit 8A receives d-axis duty Dutyd1 and q-axis duty Dutyq1 output from first output duty calculating unit 7A and also information about the rotor angle in electric motor 130. First two-to-three phase converting unit 8A calculates, based on these, duty command values DutyU1, DutyV1, and DutyW1 of three phases in first coil set 2A, and then outputs the calculated values.

In addition, a second two-to-three phase converting unit 8B receives d-axis duty Dutyd2 and q-axis duty Dutyq2 output from second output duty calculating unit 7B and also information about the rotor angle in electric motor 130. Second two-to-three phase converting unit 8B calculates, based on these, duty command values DutyU2, DutyV2, and DutyW2 of three phases in second coil set 2B, and then outputs the calculated values.

A first dead time compensation unit 9A receives duty command values DutyU1, DutyV1, and DutyW1 output from first two-to-three phase converting unit 8A. First dead time compensation unit 9A compensates for the dead time thereof to obtain, by calculation, duty command values DutyU1, DutyV1, and DutyW1 and then outputs the calculated values to first inverter 1A. In addition, a second dead time compensation unit 9B receives the duty command values DutyU2, DutyV2, and DutyW2 output from second two-to-three phase converting unit 8B. Second dead time compensation unit 9B compensates for the dead time thereof to obtain, by calculation, duty command values DutyU2, DutyV2, and DutyW2, and outputs the calculated values to second inverter 1B.

The dead time compensation means the processing for holding down a voltage drop etc. that will occur with a dead time voltage at the time of PWM control for retarding, by the dead time, the rising edge of a PWM signal as obtained by comparing a triangular wave with a command value to thereby generate a gate signal of the switching element so as not to cause a short-circuit between upper and lower arms of inverters 1A and 1B.

A determination unit 12 receives outputs from phase current sensors 314A(U), 314A(V), 314A(W), 314B(U), 314B(V), and 314B(W), outputs from peak-hold circuits 312A and 312B, an output from voltage monitor circuit 307, duty command values DutyU1, DutyV1, and DutyW1 at three phases of first coil set 2A, duty command values DutyU2, DutyV2, and DutyW2 at three phases of second coil set 2B, and the like.

Then, determination unit 12 makes a fault diagnosis on each energization system based on these input signals and hereby controls outputting an OFF command signal for the first energization system and an OFF command signal for the second energization system according to the fault diagnosis.

The OFF command signal for the first energization system output from determination unit 12 is input to a first ON/OFF control unit 13A. After receiving the OFF command signal, first ON/OFF control unit 13A turns OFF the switching elements in first inverter 1A and turns OFF phase relays 313A(U), 313A(V), and 313A(W).

Likewise, the OFF command signal for the second energization system output from determination unit 12 are input to second ON/OFF control unit 13B. After receiving the OFF command signal, second ON/OFF control unit 13B turns OFF the switching elements in second inverter 1B and turns OFF phase relays 313B(U), 313B(V), and 313B(W).

Furthermore, the OFF command signal for the first energization system and the OFF command signal for the second energization system, which are output from determination unit 12 are input to target assist torque calculating unit 6. Then, target assist torque calculating unit 6 calculates a target assist torque at each energization system according to OFF command signal(s) for first inverter 1A and/or second inverter 1B output from determination unit 12, that is, whether to operate both or either of the first energization system and the second energization system.

Figure 5:
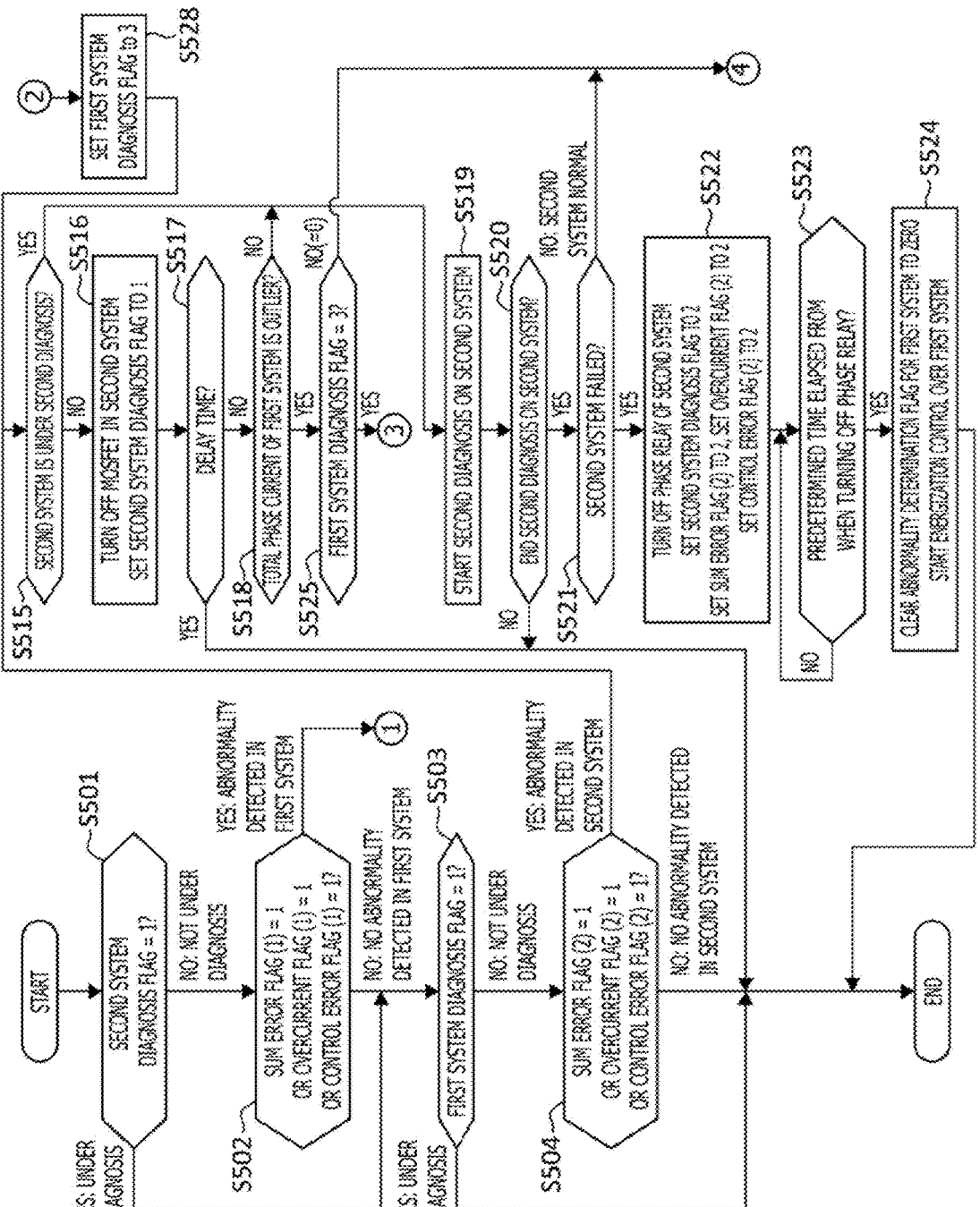
FIG. 5 is a flowchart illustrating the procedure of diagnosis processing according to the embodiment of the present invention.
Figure 6:
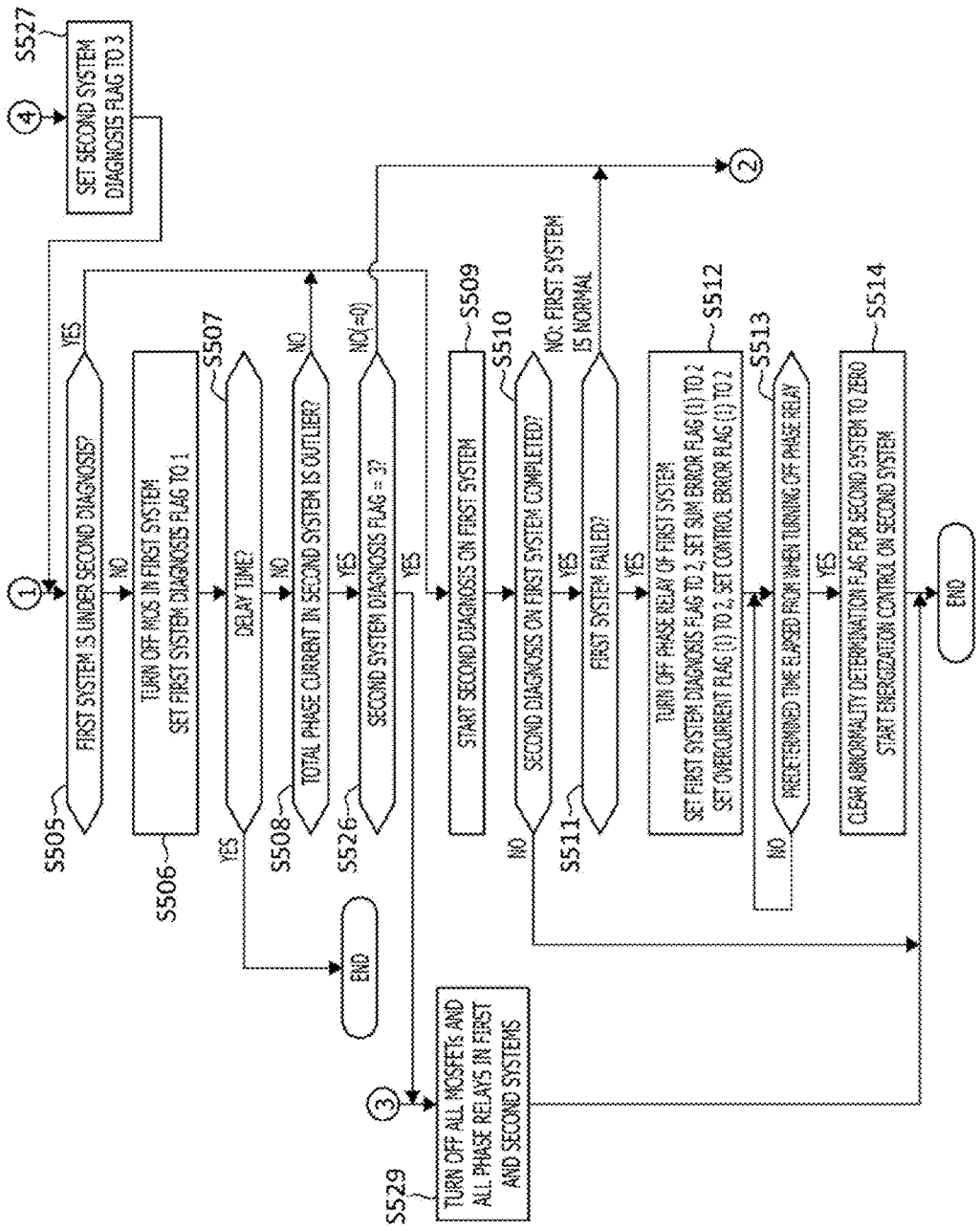
FIG. 6 is a flowchart illustrating the procedure of diagnosis processing according to the embodiment of the present invention.

Referring to flowcharts of FIGS. 5 and 6, the fault diagnostic function of microcomputer 302 is described next. The routines in the flowcharts of FIGS. 5 and 6 are executed by microcomputer 302 interruptedly at a predetermined time interval (e.g., 1 ms). The predetermined time interval may be, for example, about 1 ms.

First, in step S501, microcomputer 302 determines whether a second system diagnosis flag is set to 1. This flag is set when the second energization system is under the second diagnosis processing. If the second system diagnosis flag and a first system diagnosis flag (as described later) are set to "0", it indicates that second diagnosis processing is not yet started; if "1", the second diagnosis processing is being executed; if "2", the second diagnosis processing confirms that the energization system is abnormal; and if "3", the processing for confirming the abnormal state is suspended.

Provided that the second system diagnosis flag is not set to 1, indicating that the second diagnosis processing is not executed on the second energization system, microcomputer 302 proceeds to step S502 to determine the result of the first diagnosis processing on the first energization system.

As described below, microcomputer 302 determines whether an abnormality occurs by executing the first diagnosis processing on both the first energization system and the second energization system being subject to energization control, and executing the second diagnosis processing on both the systems not being subject to energization control. Note that the second diagnosis processing is performed to determine the determination result of the first diagnosis processing on the first energization system.

If the second diagnosis processing is not performed on the second energization system, microcomputer 302 proceeds from step S501 to step S502 and determines the result of the first diagnosis processing on the first energization system.

Microcomputer 302 makes, as the first diagnosis processing, a diagnosis as to whether the total sum of current detection values at three phases is abnormal, whether a motor current value is abnormal, whether the correlation between control duty and a current detection value is abnormal, and the like under the condition that the switching element of the inverter is subject to the PWM control, i.e., the condition that each energization system is subject to energization control.

The first diagnosis processing will be described in detail hereinbelow. Microcomputer 302 sums up current detection values in three phases at each energization system. If an absolute value of the total sum exceeds a threshold (threshold>0) for a set time, microcomputer 302 determines that any abnormality occurs in the energization system concerned and then sets a sum error flag to 1.

That is, if the total phase current of any energization system approximates zero, microcomputer 302 determines that the energization system is normal. Meanwhile, if the total phase current of any energization system deviates from a normal range around zero, the microcomputer determines that the energization system is failed.

Moreover, if a peak value of motor drive current at any energization system exceeds a preset current value for a predetermined time, microcomputer 302 determines that overcurrent occurs in the energization system concerned and then sets an overcurrent flag to 1.

In other words, if the peak value of the motor drive current remains higher than the maximum allowable value, microcomputer 302 determines that an abnormality occurs in the current.

Moreover, if an absolute value of the difference between a phase current detection value and a phase current estimated value as estimated from a duty ratio of PWM control exceeds a predetermined current value in any energization system for a predetermined time, microcomputer 302 determines that an abnormality occurs in energization control on the energization system concerned and then sets a control error flag to 1.

In other words, microcomputer 302 determines that any abnormality occurs in energization control on an energization system where a demand current does not flow into each phase; the demand current corresponds to a set duty ratio.

In the first diagnosis processing, the condition for abnormality diagnosis is that an outlier appears over a predetermined time or more, in order not to erroneously detect an abnormality when noise is superimposed on a current detection value or when current control is in transition. That is, the predetermined time is set longer than the duration in which a measurement value becomes an outlier due to noise, etc. If an outlier appears over the predetermined time or more, it is presumable that the outlier does not result from the noise, etc.

In the first diagnosis processing executed on the energization system, which is being under energization control as mentioned above, it is determined for each energization system whether the current detection value is abnormal.

If the sum error flag (1), the overcurrent flag (1), and the control error flag (1), which indicate results of the first diagnosis processing, are all set to 0, and no abnormality is found in the first energization system through the first diagnosis processing, microcomputer 302 proceeds from step S502 to step S503.

In step S503, microcomputer 302 determines whether the first system diagnosis flag is set to 1. This flag is set when the first energization system is under the second diagnosis processing.

If the first system diagnosis flag is not 1, indicating that the second diagnosis processing is not performed on the first energization system, microcomputer 302 proceeds to step S504 to determine a result of the first diagnosis processing on the second energization system.

To be specific, microcomputer 302 determines, in step S504, whether all of the sum error flag (2), the overcurrent flag (2), and the control error flag (2) are set to 0. These flags indicate results of the first diagnosis processing on the second energization system.

If all of the sum error flag (2), the overcurrent flag (2), and the control error flag (2) are set to 0, that is, no abnormality is found in the second energization system through the first diagnosis processing, microcomputer 302 ends this routine at this point.

In other words, when the first energization system and the second energization system are both normal, microcomputer 302 proceeds to steps S501, S502, S503, and S504 in this order to end this routine without executing an abnormality diagnosis nor stopping inverter output based on the abnormality diagnosis.

For example, if the first energization system involves at least one of an abnormality in the total phase current, overcurrent, and abnormal energization control, by which at least one of the sum error flag (1), the overcurrent flag (1), and the control error flag (1) is set to 1, microcomputer 302 proceeds from step S502 to step S505.

In step S505, microcomputer 302 determines whether the first energization system having an abnormality detected through the first diagnosis processing is being under the second diagnosis processing as diagnosis processing for identifying a failed portion.

Just after any fault is detected in the first energization system through the first diagnosis processing, if the second diagnosis processing is not executed, microcomputer 302 proceeds from step S505 to step S506.

In step S506, microcomputer 302 stops the PWM control over inverter 1A of the first energization system so as to execute the second diagnosis processing. Then, the microcomputer executes processing for locking all the switching elements in inverter 1A into OFF state, that is, the processing for stopping energization control over the first energization system as well as the processing for setting the first system diagnosis flag to 1.

Next, microcomputer 302 proceeds to step S507 to determine whether a predetermined time has elapsed from when the PWM control on first inverter 1A of the first energization system is stopped, that is, all the switching elements in first inverter 1A are locked into OFF state.

The predetermined time in step S507 is previously adjusted according to the time from when all the switching elements in first inverter 1A are locked to OFF state until all the switching elements in first inverter 1A actually stabilize in OFF state.

According to the predetermined time, if the predetermined time has elapsed from when all the switching elements in first inverter 1A are locked to OFF state, it is presumable that all the switching elements in first inverter 1A actually stabilize in OFF state.

If the predetermined time has not yet elapsed from when all the switching elements in first inverter 1A are locked to OFF state, that is, under transient conditions that the elements are not completely stabilized in OFF state, microcomputer 302 ends this routine at step S507 and waits for a while before proceeding to the next step.

When this routine is resumed, the history of abnormality detection in the first diagnosis processing on the first energization system is stored and thus, microcomputer 302 proceeds again to steps S502, S505, S506, and S507. Until the predetermined time has elapsed from when the switching elements of first inverter 1A are turned OFF, the above processing is repeated.

Owing to the above settings, there is little likelihood that the second diagnosis processing is executed before the switching elements in first inverter 1A can actually stabilize in OFF state, that is, before the elements can stabilize in the state in which energization control is stopped, whereby the second diagnosis processing erroneously finds an abnormality.

For example, in case any phase line of the first energization system and that of the second energization system are short-circuited, if all switching elements of the inverter in one energization system are controlled into OFF state, no current flows in and out through the short-circuited path and thus, a current flowing in each phase of the other energization system resumes a normal value.

Under the condition that the switching elements of the inverter have not stabilized in OFF state just after all the elements are turned OFF, however, the current flowing in and out through the short-circuited path still influences the current in each phase of the other energization system, whereby the detected current might show an abnormal value.

To overcome the problem, microcomputer 302 waits for some time after controlling into OFF state all the switching elements in the energization system with any abnormality being detected through the first diagnosis processing until all the switching elements actually stabilize in OFF state. After that, the microcomputer proceeds to step S508 and subsequent steps.

The above delay processing in step S507 eliminates the possibility of misdiagnosing two energization systems as failed in case of a short-circuit between the two systems to hereby stop energization control over the two energization systems. Thus, it is possible to stop the energization control over one energization system while continuing the energization control over the other energization system.

In step S508, microcomputer 302 determines whether an absolute value of the total sum of detection values of phase currents in the second energization system exceeds a threshold for the predetermined time or more. Then, if an absolute value of the total sum of detection values of phase currents in the second energization system does not exceed a threshold or if the absolute value exceeds the threshold but does not remain higher than the threshold for the predetermined time, microcomputer 302 proceeds to step S509 to start the second diagnosis processing as a diagnosis for identifying a failed portion of the first energization system.

Proceeding from step S506 to step S509, microcomputer 302 executes the second diagnosis processing on the first energization system in step S509 under the condition that all the switching elements in inverter 1A are turned OFF, i.e., the condition that the energization control over the first energization system is stopped.

Microcomputer 302 executes, as second diagnosis processing, diagnoses as to a short-circuit between the energization systems, a short-to-supply and a short-to-ground, disconnection of an energization line, a functional error in detecting a phase current, and a functional error in detecting a peak value of a motor drive current.

The diagnosis processing as to a short-circuit between the energization systems is to detect the occurrence of a short-circuit between the first and second energization systems. Microcomputer 302 switches to High or Low an output voltage to be applied to one phase of the coil set in any energization system that is the subject of the second diagnosis processing. If such phase output control influences the detection value of phase current or the total phase current in the other energization system not subject to the second diagnosis processing, the microcomputer detects the occurrence of a short-circuit between the systems.

Here, microcomputer 302 switchingly chooses one phase the output voltage to which is switched to High or Low, among three phases of the energization system that is the subject of the diagnosis. If controlling the output voltage at each of the three phases does not influence the phase current in the other energization system, the microcomputer determines that no short-circuit occurs between the energization systems.

Here, the diagnosis processing as to a short-to-supply and a short-to-ground is to detect the occurrences of a short-to-supply as a short-circuit between the power supply and the coil and a short-to-ground as a short-circuit between the ground point and the coil.

Note that the short-to-supply includes a short-circuit between the power supply and the drive line of each coil as well as a short-circuit in any high-potential side switching element. The short-to-ground includes a short-circuit between the ground point and the drive line of each coil as well as a short-circuit in any low-potential side switching element.

Microcomputer 302 makes a diagnosis as to whether a short-circuit occurs in any high-potential side switching element or low-potential side switching element based on each coil end voltage under the condition that power supply relays 304 of the energization system, which is the subject of the second diagnosis processing, are turned ON and all the switching elements of the inverter thereof are controlled into OFF state.

Furthermore, microcomputer 302 makes a diagnosis as to whether a short-circuit occurs between the drive line and the power supply or the ground point based on each coil end voltage while turning OFF power supply relays 304 of the energization system that is the subject of the second diagnosis processing.

For example, microcomputer 302 determines that a short-to-supply or a short-to-ground occurs in the energization system, which is the subject of the second diagnosis processing, if an additional value of coil end voltages at three phases thereof as detected by voltage monitor circuit 307 deviates from a predetermined range based on a fixed potential obtained through a pull-up resistor RA.

The diagnosis processing as to the disconnection of any energization line is to determine whether disconnection occurs.

When the output voltage to one phase of the coil set in the energization system, which is the subject of the second diagnosis processing, is set to High or Low, if a detection value of output voltage to any other phase of the coil set does not correspond to a predetermined voltage value, microcomputer 302 determines that the energization line is disconnected.

Meanwhile, microcomputer 302 switchingly chooses one phase the output voltage to which is switched to High or Low, among the phases in the coil set of the energization system that is the subject of the second diagnosis processing. If a detection value of the output voltage to any other phase reflects the control on the output voltage at all three phases, the microcomputer determines that no drive line is disconnected.

The diagnosis processing as to the phase current detecting function is to determine whether any error occurs in the function of detecting current in each phase, that is, whether any abnormality occurs in any phase current sensor 314.

If all the switching elements in the inverter of the energization system, which is the subject of the second diagnosis processing, are turned OFF and the total sum of detection values of phase currents exceeds a predetermined current value, microcomputer 302 determines that any fault occurs in the phase current sensor 314.

The diagnosis processing as to the peak value detecting function is to determine whether an error occurs in the function of detecting a peak value of motor drive current, i.e., whether any fault occurs in any peak-hold circuit 312. If all the switching elements in the inverter of the energization system, which is the subject of the second diagnosis processing, are turned OFF and the detected peak value of motor drive current exceeds a predetermined current value, microcomputer 302 determines that an error occurs in the function of detecting the peak value of motor drive current, or determines that any fault occurs in the peak-hold circuit 312.

As described above, microcomputer 302 executes the second diagnosis processing as to a short-circuit between the energization systems, a short-to-supply and a short-to-ground, the disconnection of any energization line, an error in the phase current detecting function, and an error in the peak value detecting function as above, while stopping the PWM control of the first energization system having an abnormality detected through the first diagnosis processing, i.e., while stopping energization control for driving the motor.

After starting the second diagnosis processing on the first energization system in step S509, microcomputer 302 proceeds to step S510 to determine whether the second diagnosis processing on the first energization system is completed. If the second diagnosis processing is still executed on the first energization system, microcomputer 302 ends this routine at this point. When the second diagnosis processing on the first energization system is completed, the microcomputer proceeds to step S511.

If the first energization system is being under the second diagnosis processing, microcomputer 302 ends this routine instead of proceeding from step S510 to step S511.

When returning to step S501, microcomputer 302 determines in step S501, that the second system diagnosis flag is not set to 1 and further determines in step S502, that any abnormality is detected through the first diagnosis processing on the first energization system. If the total phase current of the second energization system is normal, the microcomputer proceeds from step S505 to step S510.

Then, in step S510, if determining that the second diagnosis processing on the first energization system is completed, microcomputer 302 proceeds to step S511.

In step S511, microcomputer 302 determines whether any fault is detected through the second diagnosis processing on the first energization system having an abnormality detected through the first diagnosis processing.

If the second diagnosis processing finds no abnormality in the first energization system having an abnormality detected through the first diagnosis processing, microcomputer 302 proceeds from step S511 to step S528 to set "3" to the first system diagnosis flag. Then, the microcomputer proceeds to step S515 and subsequent steps to execute the second diagnosis processing on the second energization system.

Then, if the second diagnosis processing finds a fault in the second energization system, microcomputer 302 proceeds to step S524 to clear the abnormality determination flag for the first energization system to zero as well as resume energization control over the first energization system.

In other words, when an abnormality is detected through the first diagnosis processing on the first energization system or it is determined that the total phase current in the second energization system is normal, microcomputer 302 executes the second diagnosis processing on the first energization system.

Then, if the second diagnosis processing detects no abnormality in the first energization system, microcomputer 302 executes the second diagnosis processing on the second energization system because the first diagnosis processing might have erroneously detected an abnormality in the first energization system due to an abnormality of the second energization system.

Here, if the second diagnosis processing detects an abnormality in the second energization system, the following is thereby confirmed: the first diagnosis processing has erroneously detected an abnormality in the first energization system under the influence of the abnormality in the second energization system. Thus, when the second diagnosis processing finds an abnormality in the second energization system, microcomputer 302 resumes energization control over the normal first energization system.

On the other hand, if the second diagnosis processing detects an abnormality in the first energization system having an abnormality detected through the first diagnosis processing, microcomputer 302 proceeds to step S512.

That is, if the second diagnosis processing on the first energization system finds at least one of a short-circuit between the systems, a short-to-supply and a short-to-ground, disconnection of any energization line, an error of the phase current detecting function, and an error of the peak current detecting function, microcomputer 302 proceeds from step S511 to step S512.

In step S512, microcomputer 302 controls all phase relays 313A(U), 313A(V), and 313A(W) of the first energization system into OFF state such that phase relays 313A(U), 313A(V), and 313A(W) interrupt energization to each coil of first coil set 2A in the first energization system.

In step S512, microcomputer 302 sets the first system diagnosis flag to "2", indicating that the detected abnormality in the first energization system is confirmed. In addition, in step S512, microcomputer 302 sets the sum error flag (1), the overcurrent flag (1), and the control error flag (1) to "2", indicating that the detected abnormality is confirmed.

Next, microcomputer 302 proceeds to step S513 to determine whether a predetermined time (e.g., 10 ms) has elapsed from when phase relays 313A(U), 313A(V), and 313A(W) of the first energization system are controlled into OFF state in step S512. This processing is performed to determine whether a delay time has elapsed from when phase relays 313A(U), 313A(V), and 313A(W) are turned OFF until the energization to each phase is actually interrupted. Note that in step S513, the predetermined time is set to, for example, 10 ms.

For example, if an electromagnetic relay is used for phase relays 313, it requires longer delay time during which energization is actually interrupted after phase relays 313 are turned OFF. Then, microcomputer 302 executes the processing in step S513 not to proceed to step S514 before energization is actually interrupted. When determining that the delay time has elapsed in step S513, microcomputer 302 proceeds to step S514.

In step S514, microcomputer 302 clears all of the sum error flag (2), the overcurrent flag (2), and the control error flag (2) of the second energization system to zero and then starts PWM control on second inverter 1B in the second energization system. In other words, if the first diagnosis processing detects an abnormality in the first energization system and also, the second diagnosis processing detects an abnormality in the first energization system, microcomputer 302 stops an output from first inverter 1A while stopping energization control over the first energization system. Meanwhile, the microcomputer executes energization control over the second energization system so as to drive electric motor 130 using an output from second inverter 1B.

As described above, if all phase relays 313A of the first energization system are turned OFF in case an abnormality occurs in the first energization system, it is possible to avoid erroneously detecting an abnormality in the second energization system under the influence of the abnormality in the first energization system.

More specifically, if a short-circuit occurs in the first energization system and a loop current flows through the short-circuited portion, an apparent coil inductance of the second energization system thus decreases and overshoot appears in the energization current, leading to the possibility of erroneously detecting an abnormality in the second energization system.

In contrast, if phase relays 313A of the first energization system are turned OFF, no loop current flows through the short-circuited portion of the first energization system and a magnetic flux generated in the normal second energization system is not cancelled, making it possible to avoid erroneous detection of an abnormality in the second energization system.

As described above, when a short-circuit occurs between the energization systems or when the first energization system is abnormal, whereas the second energization system is normal, microcomputer 302 executes the aforementioned processing in steps S512 to S514 to stop the energization control over the first energization system and continue the energization control over the second energization system.

When returning to step S501 in such a state, microcomputer 302 executes the processing in steps S501, S502, S503, and S504 in this order. As long as the second energization system is normal, the microcomputer stops operating the first energization system and continues energization control over the second energization system.

On the other hand, if the first energization system is normal, whereas the second energization system has an abnormality, microcomputer 302 executes the same processing as above.

To be specific, if the first diagnosis processing detects an abnormality in the second energization system, microcomputer 302 proceeds from step S504 to step S515.

Similar to the above case in which a fault occurs in the first energization system, microcomputer 302 executes the second diagnosis processing on the second energization system. If the second diagnosis processing finds an abnormality in the second energization system, the microcomputer stops the energization control over the second energization system and drives electric motor 130 by performing the energization control over the first energization system.

More specifically, the processing in steps S505 to S508, S526, and S509 to S514 implies the second diagnosis processing on the first energization system. The processing in steps S515 to S518, S525, and S519 to S524 implies the second diagnosis processing on the second energization system. In this way, similar processing is performed in corresponding steps, although being executed on different energization systems.

Here, if the second diagnosis processing detects a fault in the second energization system, microcomputer 302 turns OFF phase relays 313B of the second energization system to interrupt the energization in step S522 to thereby avoid misdiagnosing the first energization system as failed under the influence of the short-circuit in the second energization system.

Meanwhile, when a short-circuit occurs in the first energization system, there is a possibility of misdiagnosing the normal second energization system as failed through the first diagnosis processing under the influence of the short-circuit.

In this case, microcomputer 302 proceeds from step S504 to steps S515, and S516 to S517. After the lapse of the standby time after turn-off, the microcomputer proceeds to step S518.

In this example, since the first energization system has a short-circuit, even if microcomputer 302 waits for the standby time after turn-off and then proceeds to step S518, the microcomputer determines that the total phase current in the first energization system being under the energization control is an outlier As a result, microcomputer 302 proceeds from step S518 to step S525. In step S525, as the first system diagnosis flag is not set to "3", the microcomputer further proceeds to step S527.

In step S527, microcomputer 302 sets the second system diagnosis flag to "3". Next, microcomputer 302 proceeds to step S505 and subsequent steps to execute the second diagnosis processing on the first energization system. If the first energization system is diagnosed as failed, microcomputer 302 proceeds to steps S512 to S514 to stop the energization control over the first energization system as well as resume the energization control over the second energization system such that electric motor 130 is driven by the second energization system.

Also when the second energization system has a short-circuit, and the first energization system is erroneously diagnosed as failed through the first diagnosis processing under the influence of such short-circuit, similar processing is executed.

That is, when detecting that the total phase current in the second energization system is an outlier in step S508, microcomputer 302 proceeds from step S508 to step S526. In this step, the second system diagnosis flag is not set to 3, the microcomputer proceeds to step S528 and further to step S515 and subsequent steps for the second diagnosis processing on the second energization system.

Moreover, when the total phase current in the second energization system is normal even though the first diagnosis processing finds an abnormality in the first energization system, microcomputer 302 proceeds from step S508 to step S509 and subsequent steps to perform the second diagnosis processing on the first energization system.

When the second diagnosis processing finds no abnormality in the first energization system, microcomputer 302 proceeds from step S511 to step S528 and further to step S515 and subsequent steps for the second diagnosis processing on the second energization system.

In step S528, microcomputer 302 sets the first system diagnosis flag to 3. Next, microcomputer 302 proceeds to step S515 and subsequent steps to execute the second diagnosis processing on the second energization system. When the second energization system is diagnosed as failed, the microcomputer proceeds to steps S522 to S524 to stop the energization control over the second energization system as well as resume the energization control over the first energization system, so that the first energization system can alternatively drive electric motor 130.

As described above, according to the energization control of this embodiment, even when the first diagnosis processing detects a fault in the normal energization system under the influence of a short-circuited energization system, it is possible to stop operating the energization system that is actually short-circuited and continue operating the normal energization system.

Moreover, when proceeding to steps S505 to S508 based on the result of the first diagnosis processing on the first energization system, for example, under the condition that the two energization systems are short-circuited, microcomputer 302 detects the occurrence of an abnormality in the second energization system in step S508 and thus proceeds to step S528 and further to steps S515 to S518. When detecting an abnormality in the first energization system in step S518, the microcomputer determines that the first system diagnosis flag is set to 3 in step S525 and then proceeds to step S529.

Microcomputer 302 turns OFF all the switching elements of the first energization system and the second energization system in step S529 and also turns OFF phase relays 313A of the first energization system and phase relays 313B of the second energization system, hereby stopping energization to first coil set 2A and second coil set 2B.

On the other hand, when proceeding to steps S515 to S518 based on the result of the first diagnosis processing on, for example, the second energization system in case of a short-circuit between the two energization systems, microcomputer 302 detects the occurrence of an abnormality in the first energization system in step S518 and thus proceeds to step S527 and further to steps S505 to S508. When detecting an abnormality in the second energization system in step S508, the microcomputer determines that the second system diagnosis flag is set to 3 in step S526 and thus proceeds to step S529.

As described above, when a short-circuit occurs between the two energization systems, microcomputer 302 stops operating both the two energization systems.

According to the diagnosis processing illustrated in the flowcharts of FIGS. 5 and 6, if a short-circuit occurs in either one of the two energization systems, phase relays 313 of the short-circuited energization system is turned OFF, while the other normal energization system continues to operate.

This makes it possible to avoid the cancellation of a magnetic flux generated in the normal energization system due to a loop current in the short-circuited energization system and thus to reduce the possibility that when the microcomputer continues to operate the normal energization system, current overshoot occurs with the loop current to thereby misdiagnose the normal system as failed.

As a result, even if a short-circuit occurs in one of the energization systems, the other normal energization system can alternatively continue to drive electric motor 130 so as to generate an assist torque.

In addition, when a short-circuit occurs in one of the energization systems and causes overshoot in the energization current to the other energization system, even if an abnormality in the other energization system is detected first, microcomputer 302 executes the second diagnosis processing on the one energization system based on the abnormal total phase current in the one energization system to detect the occurrence of a short-circuit in the one energization system and then, resumes operating the other energization system.

Accordingly, even if an abnormality is detected in the other energization system under the influence of the short-circuit in the one energization system, it is possible to stop operating the one energization system as well as operate the other energization system to continue driving electric motor 130.

Furthermore, after turning OFF all the switching elements of the one energization system and then confirming whether a predetermined period has elapsed so that the system is actually stabilized in OFF state, microcomputer 302 detects abnormal control of the other energization system. Thus, if a short-circuit occurs between the first energization system and the second energization system, it can be determined whether the other energization system involves the abnormal control under the condition that no current flows between the energization systems.

Hence, in case of a short-circuit between the energization systems, it is possible to avoid misdiagnosing the two energization systems as failed and to operate one of them so as to continue driving electric motor 130.

Moreover, when the first diagnosis processing finds an abnormality, for example, in the first energization system to thereby stop the energization control over the first energization system and then the second diagnosis processing is performed, electric motor 130 can be continuously driven by the second energization system. In this way, it is possible to prevent electric motor 130 from being interruptedly stopped because of the diagnosis.

Hereinbefore, the present invention is described in detail on the basis of the preferred embodiment but it is obvious that one skilled in the art can make various modifications within the basic technical ideas and teachings of the present invention.

The controller for a motor of the present invention is applicable to an electric motor where three-phase coils U, V, and W are connected by means of delta connection as well as electric motor 130 having three-phase coils U, V, and W star-connected.

Furthermore, the controller for an electric motor of the present invention is applicable as well to an apparatus equipped with three or more coil sets including three-phase coils U, V, and W and three or more inverters for driving the respective coil sets.

Furthermore, the controller of the present invention is applicable to not only the electric motor that generates a steering assist force in a vehicle electric power steering device but also to various motors such as a motor serving as an actuator for a variable valve mechanism of an engine and a motor used for driving a pump.

In addition, if any one of plural energization systems is failed, a warning device such as a warning lamp or buzzer can be operated to inform a driver of the vehicle about an abnormality etc. in an electric power steering device incorporating the electric motor.

REFERENCE SYMBOL LIST 1A first inverter
1B second inverter
2A first coil set 2B second coil set
4 output voltage calculating unit
5 motor rotational speed calculating unit
6 target assist torque calculating unit
7A first output duty calculating unit
7B second output duty calculating unit
8A first two-to-three phase converting unit
8B second two-to-three phase converting unit
9A first dead time compensation unit
9B second dead time compensation unit
11 three-to-two phase converting unit
12 determination unit
13A first ON/OFF control unit
13B second ON/OFF control unit
130 electric motor
150 electronic control unit
301A, 301B current sensor
302 microcomputer
304A, 304B power supply relay
313A(U), 313A(V), 313A(W), 313B(U), 313B(V), 313B (W) phase relay
314A(U), 314A(V), 314A(W), 314B (U), 314B(V), 314B (W) phase current sensor
307 voltage monitor circuit
UHA, VHA, WHA, UHB, VHB, WHB high-potential side switching element
ULA, VLA, WLA, ULB, VLB, WLB low-potential side switching element

The invention claimed is:

1. A controller for an electric motor equipped with a plurality of energization systems each composed of an inverter and coils corresponding to a plurality of phases, the controller comprising:
a control unit configured to
receive a detection value of a current in each of the energization systems and output a control signal to the respective inverter of each of the energization systems;
execute a first diagnosis to detect an occurrence of an abnormality in each of the energization systems under energization control; and
execute a second diagnosis to detect an occurrence of an abnormality in each of the energization systems not under energization control,
wherein when (i), in the first diagnosis, the control unit detects an abnormality in one of the energization systems and, in the second diagnosis, the control unit detects no abnormality in the one of the energization systems, or (ii) when, in the first diagnosis, the control unit detects an abnormality in one of the energization systems, the control unit is configured to
stop energization control over the one of the energization systems, and, in such a state, following detection of an abnormality in another of the energization systems, restart energization control over the one of the energization systems so as to drive the electric motor;
wherein when, in the second diagnosis, the control unit detects no abnormality in the one of the energization systems and detects an abnormality in another of the energization systems, the control unit restarts energization control over the one of the energization systems where no abnormality is detected in the second diagnosis; and
wherein the control unit is configured to perform the second diagnosis on a part of the energization systems, and the electric motor is supplied with current from another of the energization systems not subject to the second diagnosis.

2. The controller for an electric motor according to claim 1, wherein when the abnormality detected through the second diagnosis is a short-circuit, the control unit restarts the energization control over the one of the energization systems where no abnormality is detected through the second diagnosis.

3. The controller for an electric motor according to claim 1,
wherein the electric motor includes at least one relay for interrupting energization, the at least one relay being disposed between an output point of the inverter and each of the coils, and
wherein the control unit interrupts, by the at least one relay, energization to one of the energization systems where an abnormality is detected through the second diagnosis.

4. The controller for an electric motor according to claim 1, wherein the control unit determines, as the first diagnosis, whether the total sum of currents flowing in the respective phases of each of the energization systems is abnormal, whether a motor drive current from each of the energization systems is higher than a preset value, or whether a correlation between a manipulated variable of the inverter and a detection value of a current flowing in each of the phases is abnormal.

5. The controller for an electric motor according to claim 1, wherein the control unit detects, as the second diagnosis, occurrences of a short-circuit, disconnection, or an error in current detection.

6. A controller for an electric motor equipped with a plurality of energization systems each composed of an inverter and coils corresponding to a plurality of phases, the controller comprising:
a control unit configured to
receive a detection value of a current in each of the energization systems and output a control signal to the respective inverter of each of the energization systems;
execute a first diagnosis to detect an occurrence of an abnormality in each of the energization systems under energization control; and
execute a second diagnosis to detect an occurrence of an abnormality in each of the energization systems not under energization control,
wherein when (i), in the first diagnosis, the control unit detects an abnormality in one of the energization systems and, in the second diagnosis, the control unit detects no abnormality in the one of the energization systems, or (ii) when, in the first diagnosis, the control unit detects an abnormality in one of the energization systems, the control unit is configured to
stop energization control over the one of the energization systems, and, in such a state, following detection of an abnormality in another of the energization systems, restart energization control over the one of the energization systems so as to drive the electric motor;
wherein when, in the second diagnosis, the control unit detects no abnormality in the one of the energization systems and detects an abnormality in another of the energization systems, the control unit restarts energization control over the one of the energization systems where no abnormality is detected in the second diagnosis; and wherein the control unit is configured to perform the second diagnosis on the one of the energization systems where an abnormality is detected through the first diagnosis, and when no abnormality is detected in the one of the energization systems through the second diagnosis, the control unit performs the second diagnosis on another of the energization systems.

7. The controller for an electric motor according to claim 6, wherein when the abnormality detected through the second diagnosis is a short-circuit, the control unit restarts the energization control over the one of the energization systems where no abnormality is detected through the second diagnosis.

8. The controller for an electric motor according to claim 6,
wherein the electric motor includes at least one relay for interrupting energization, the at least one relay being disposed between an output point of the inverter and each of the coils, and
wherein the control unit interrupts, by the at least one relay, energization to one of the energization systems where an abnormality is detected through the second diagnosis.

9. The controller for an electric motor according to claim 6, wherein the control unit determines, as the first diagnosis, whether a total sum of currents flowing in the respective phases of each of the energization systems is abnormal, whether a motor drive current from each of the energization systems is higher than a preset value, or whether a correlation between a manipulated variable of the inverter and a detection value of a current flowing in each of the phases is abnormal.

10. The controller for an electric motor according to claim 6, wherein the control unit detects, as the second diagnosis, occurrences of a short-circuit, disconnection, or an error in current detection.

11. A controller for an electric motor equipped with a plurality of energization systems each composed of an inverter and coils corresponding to a plurality of phases, the controller comprising:
a control unit configured to
receive a detection value of a current in each of the energization systems and output a control signal to the respective inverter of each of the energization systems;
execute a first diagnosis to detect an occurrence of an abnormality in each of the energization systems under energization control;
execute a second diagnosis to detect an occurrence of an abnormality in each of the energization systems not under energization control, and
wherein when (i), in the first diagnosis, the control unit detects an abnormality in one of the energization systems and, in the second diagnosis, the control unit detects no abnormality in the one of the energization systems, or (ii) when, in the first diagnosis, the control unit detects an abnormality in one of the energization systems, the control unit is configured to
stop energization control over the one of the energization systems, and, in such a state, following detection of an abnormality in another of the energization systems, restart energization control over the one of the energization systems so as to drive the electric motor;
wherein the electric motor comprises two energization systems as the plurality of energization systems;
wherein the control unit is configured to stop energization control over the one of the energization systems when, in the first diagnosis, the control unit detects an abnormality in the one of the energization systems;
wherein when a total sum of currents flowing in the respective phases of the another of the energization systems is normal while the energization control over the one of the energization systems is stopped, the control unit performs the second diagnosis on the one of the energization systems;
wherein when, in the second diagnosis, the control unit detects no abnormality in the one of the energization systems, the control unit performs the second diagnosis on the another of the energization systems, and
wherein when, in the second diagnosis, the control unit detects an abnormality in the another of the energization systems, the control unit restarts the energization control over the one of the energization systems.

12. The controller for an electric motor according to claim 11,
wherein the electric motor includes relays for interrupting energization, which are disposed between an output point of the inverter and each of the coils, and
wherein the control unit turns OFF all the relays of the one of the energization systems when an abnormality is detected in the one of the energization systems while executing energization control over the another of the energization systems.

13. The controller for an electric motor according to claim 12, wherein when energization control over one of the energization systems is stopped, and in such a state, the total sum of currents flowing in the respective phases of the another of the energization systems is abnormal, the control unit stops energization control over the one of the energization systems and energization control over the another of the energization systems to turn OFF all the relays of the one of the energization systems and the another of the energization systems.

14. The controller for an electric motor according to claim 11, wherein after a predetermined time has elapsed from when energization control over the one of the energization systems is stopped, the control unit determines whether the total sum of currents flowing in the respective phases of the another of the energization systems is normal or abnormal.

15. The controller for an electric motor according to claim 11, wherein when the abnormality detected through the second diagnosis is a short-circuit, the control unit restarts the energization control over the one of the energization systems where no abnormality is detected through the second diagnosis.

16. The controller for an electric motor according to claim 11,
wherein the electric motor includes at least one relay for interrupting energization, the at least one relay being disposed between an output point of the inverter and each of the coils, and
wherein the control unit interrupts, by the at least one relay, energization to one of the energization systems where an abnormality is detected through the second diagnosis.

17. The controller for an electric motor according to claim 11, wherein the control unit determines, as the first diagnosis, whether the total sum of currents flowing in the respective phases of each of the energization systems is abnormal, whether a motor drive current from each of the energization systems is higher than a preset value, or whether a correlation between a manipulated variable of the inverter and a detection value of a current flowing in each of the phases is abnormal.

18. The controller for an electric motor according to claim 11, wherein the control unit detects, as the second diagnosis, occurrences of a short-circuit, disconnection, or an error in current detection.

* * * * *